US009807051B1

(12) United States Patent
Mohanty et al.

(10) Patent No.: US 9,807,051 B1
(45) Date of Patent: Oct. 31, 2017

(54) SYSTEMS AND METHODS FOR DETECTING AND RESOLVING SPLIT-CONTROLLER OR SPLIT-STACK CONDITIONS IN PORT-EXTENDED NETWORKS

(71) Applicant: Cisco Technology, Inc., San Jose, CA (US)

(72) Inventors: Subrat Mohanty, Los Gatos, CA (US); Manpreet Sing Sandhu, San Jose, CA (US); James Cameron Gibson, Belmont, MA (US); Abilash Menon, Boxborough, MA (US); Ganesh Srinivasa Bhat, Union City, CA (US); Eden Tan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 14/747,351

(22) Filed: Jun. 23, 2015

(51) Int. Cl.
*H04L 29/12* (2006.01)
*H04L 12/947* (2013.01)

(52) U.S. Cl.
CPC ......... *H04L 61/2046* (2013.01); *H04L 49/25* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 2006/0168192 A1* | 7/2006 | Sharma | G06F 11/2028 709/224 |
| 2007/0025253 A1* | 2/2007 | Enstone | H04L 47/10 370/235 |
| 2012/0287930 A1* | 11/2012 | Raman | H04L 45/02 370/392 |
| 2013/0064137 A1* | 3/2013 | Santoso | H04L 49/70 370/254 |
| 2013/0073711 A1* | 3/2013 | Hanka | H04L 45/58 709/223 |
| 2014/0036675 A1* | 2/2014 | Wang | G06F 9/52 370/235 |
| 2016/0149751 A1* | 5/2016 | Pani | H04L 41/0668 370/221 |
| 2016/0315814 A1* | 10/2016 | Thirumurthi | H04L 41/0843 |

* cited by examiner

*Primary Examiner* — Donald Mills
(74) *Attorney, Agent, or Firm* — Meunier Carlin & Curfman LLC

(57) ABSTRACT

A method for resolving split conditions in a port-extended network comprises receiving first information indicative of a first MAC address of a first controller on a first fabric link and second information indicative of a second MAC address of a second controller on a second fabric link. The method may also include determining that the first MAC address differs from the second MAC address and responsively determining that one of the first MAC address or the second MAC address was previously associated with a primary controller of the port-extended network. One of the first controller or the second controller is designated as the primary controller of the port-extended network based on the determination that one of the first MAC address or the second MAC address was previously associated with the primary controller.

20 Claims, 7 Drawing Sheets

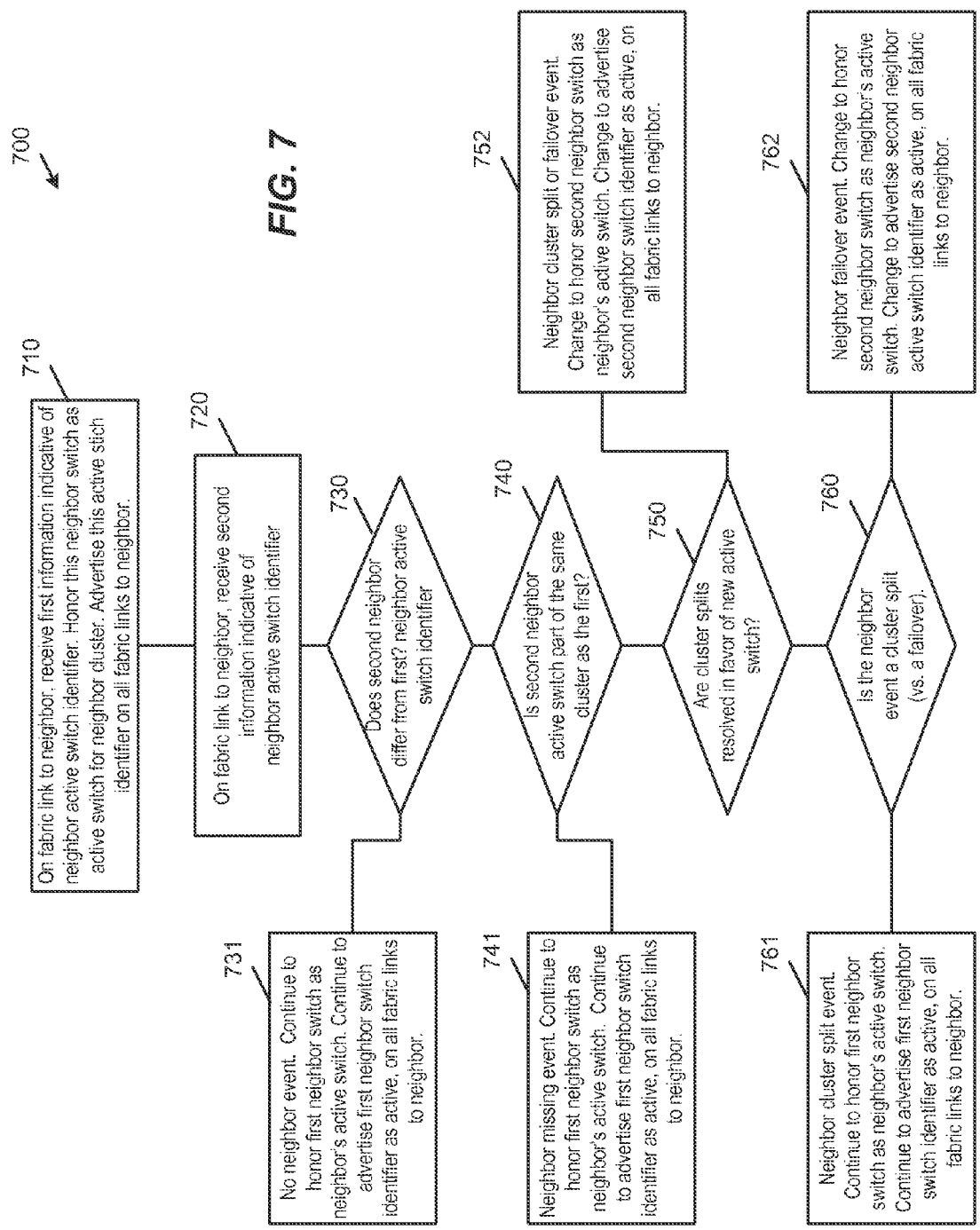

SYSTEMS AND METHODS FOR DETECTING AND RESOLVING SPLIT-CONTROLLER OR SPLIT-STACK CONDITIONS IN PORT-EXTENDED NETWORKS

TECHNICAL FIELD

The present disclosure relates generally to port-extended architectures made up of nodes that may themselves be clustered (aggregated) collections of multiple switches rather than each being a single switch and, more particularly, to systems and methods operating among the nodes for resolving split-node (split-brain, stack-split) conditions caused by a failure in one or more of the node-internal communication links.

BACKGROUND

A network segment typically consists of multiple interconnected switches arranged in some sort of hierarchy. These switches at different points in the segment must meet different requirements, and are thus typically of multiple types. At the core of the segment, high throughput modular switches with high speed interfaces may be required. At the edges, the most important factors may be reduced physical size, lower power consumption, tolerance for a wider range of environment conditions, or support for a variety of interface types for connecting to a variety of external devices. Tradeoffs between redundancy and cost are often different at different locations in the network segment.

Conventionally, each switch in the network segment was an independently management standalone device, with its own standalone redundancy. Making the switches standalone and fully manageable increases the cost and complexity of the switch. Managing the network segment requires not just managing the segment's external ports (through which the network segment provides the services that give it value) but managing the switches and the interconnections between those switches. Network segment expansion requires more switches, more interconnections, and more network management overhead.

In an effort to contain this growth in costs, various architectures have been developed to aggregate multiple switches into a single logical switch, managed as a single entity and with a collective redundancy design. Among these architectures are port extenders, Virtual Switching System (VSS) and switch stacks.

Port extension is a hierarchical (controller/satellite) aggregation technique in which certain switches are treated as distributed or "extended" line cards. Conventional modular switch architectures relied on the use of one or redundant supervisor modules coupled to one or more port termination modules (i.e., "line cards") through specialized (and often proprietary) backplane circuitry. With port extension, conventional line card functionality is provided by a separate "satellite" switch that is remotely connected back to the "controller" switch, e.g. over one or more Ethernet links or over some underlying network. The satellite switch is treated as a remote line card of the controller switch. The satellite switch and its connectivity with the controller switch are handled automatically, just as is done with a local linecard and its connection to the backplane.

VSS, switch stacks, and the like are symmetrical (primary/secondary) aggregation techniques, in which two or more physical switches are joined together by some set of links or some underlying network, and where one of the switches acts as the "primary" switch, representing the logical switch to external entities and managing the others physical switches. These approaches may differ in the details of how the physical switches are connected as the capacity, scalability, reliability and other aspects of this interconnection is a key aspect of the aggregated switch (e.g. stackable switches are often connected in a ring topology, possibly with special hardware), and may also differ in terminology (e.g. "stack master" may be used for the current primary switch and "ordinary stack member" may be used for a current secondary switch). These symmetrical approaches have in common, however, that multiple, often all, of the physical switches are capable of acting as the primary switch, providing a level of redundancy to the logical switch design. In the event the current primary switch experiences some event (power outage, fault) that prevents its operation, the other physical switches can automatically detect this outage and one of them can automatically assume the role of primary physical switch, allowing the logical switch to continue to function.

For the symmetric aggregation techniques (VSS, stacking, etc.) described here, a subtlety in their redundancy architecture must be considered. Typically, the switches are connected via a dedicated communication link, which provides an interface for the switches to detect failure events in the others. If the primary switch fails, one of the secondary switches can detect the failure and maintain network operation by substituting as the new primary switch. In some cases, irregular conditions that do not amount to a failure of the primary switch may cause the secondary switch to attempt to assert itself as the primary switch. For example, in some situations a failure in the communication connection between the primary switch and one of the secondary switches will be perceived by the secondary switch as a failure in the current primary switch, potentially resulting in the secondary switch asserting itself to its neighbor switches as the new primary switch. Because the triggering event was a communication link failure rather than a failure in the original primary switch, the original primary switch still asserts itself as the primary switch. The condition where two physical switches from the same logical switch both present themselves as the primary switch may create a "split-node" conflict (known variously as "stack split", "split brain", "dual master", and similar terms, depending on the aggregation technique in use) in the network segment. The failure in the logical switch's internal communication connection need not be of extended duration (e.g., in order to minimize network interruption, this failover process is typically configured to be very sensitive). That is, the system is configured to provide redundancy when almost any irregularity by the primary switch is detected on the network.

Finally, these aggregation techniques are not mutually exclusive, and may be combined. The hierarchical port extender architecture describes a logical port-extended switch that aggregates a controller and multiple satellites, but the controller node may itself be a logical switch (that aggregates multiple symmetric physical switches and looks like a single controller to the satellites), and/or any satellite node may itself be a logical switch (that aggregates multiple symmetric physical switches and looks like a single satellite node to the controller node). Thus, a controller node consists of possibly multiple controller switches and a satellite node consists of possibly multiple satellite switches.

In the port-extended network described here, split-node conditions, such as those described above, may occur either in the controller node (split-controller) or in a satellite node (split-satellite). In order for the port-extended logical system to function properly, such conditions should be resolved in a timely and orderly fashion. The presently disclosed systems and methods for detecting and resolving split-node conditions in port-extended networks of aggregated nodes are directed to overcoming one or more of the problems set forth above and/or other problems in the art.

BRIEF DESCRIPTION OF THE DRAWINGS

FIG. 7 illustrates a flowchart depicting an exemplary process for detecting and resolving split-node (split-brain or stack-split) conditions, in accordance with certain disclosed embodiments.

DETAILED DESCRIPTION

Figure 1:
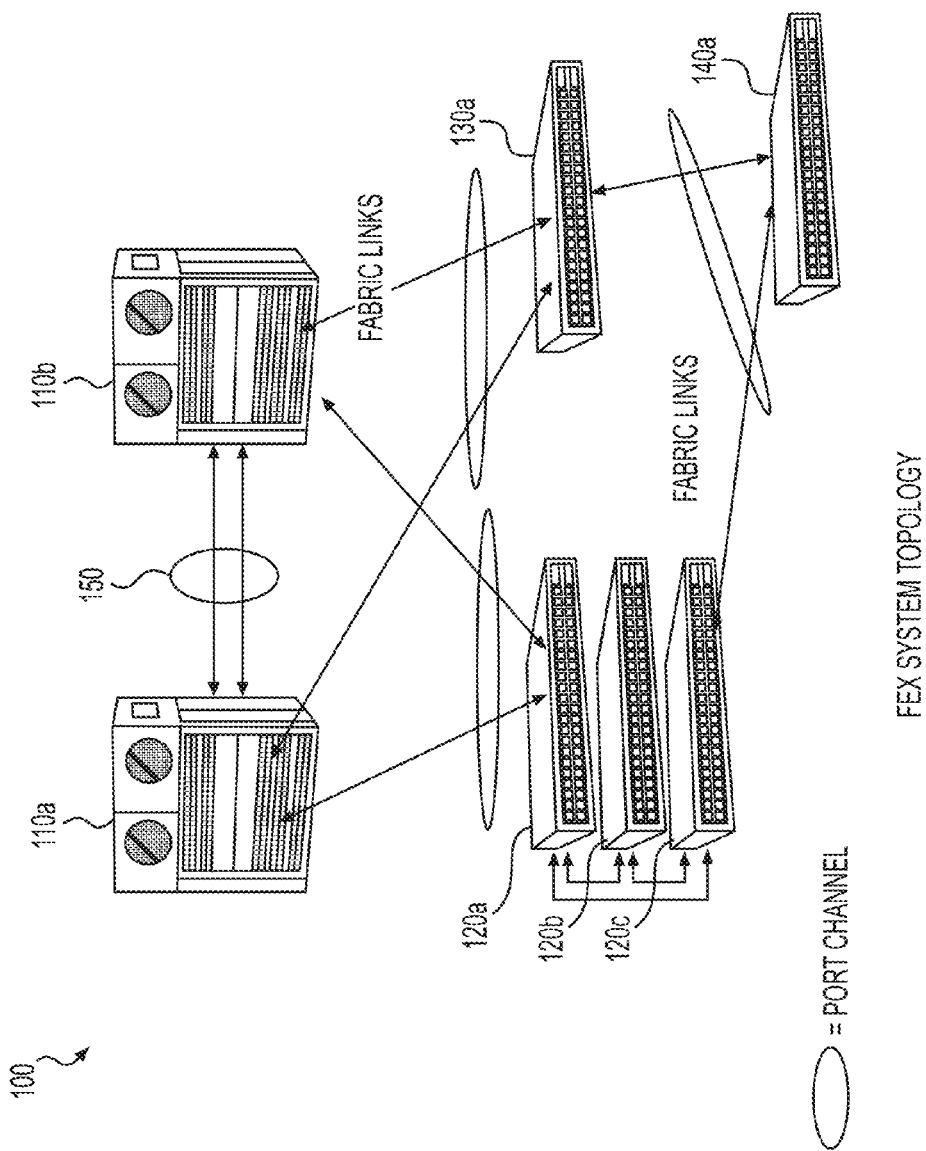
FIG. 1 illustrates an exemplary port-extended network environment, such as a fabric-extended network, consistent with certain disclosed embodiments.

In accordance with one aspect, the present disclosure is directed to a method for resolving split conditions in a port-extended network. The method may comprise a satellite receiving first information indicative of a first MAC address of a first controller on a first fabric link and second information indicative of a second MAC address of a second controller on a second fabric link. The method may also include determining that the first MAC address differs from the second MAC address and responsively determining that one of the first MAC address or the second MAC address was previously associated with the primary controller switch of the port-extended network. One of the first controller switch or the second controller switch is designated as the primary controller switch of the controller node and hence of the port-extended network based on the determination that one of the first MAC address or the second MAC address was previously associated with the primary controller switch.

According to another aspect, the present disclosure is directed to a network node associated with a port-extended network comprising a first plurality of fabric ports and a processor that is communicatively coupled to the fabric ports. The fabric ports may each be configured for communication with at least one node coupled to the port-extended network. The process may be configured to receive first information indicative of a first MAC address of a first controller from a first of the fabric ports and receive second information indicative of a second MAC address of a second controller from a second of the fabric ports. The processor may also be configured to determine that the first MAC address differs from the second MAC address, and responsively determined that one of the first MAC address or the second MAC address was previously associated with the primary controller switch of the port-extended network. The processor may be further configured to designate one of the first controller or the second controller as the primary controller switch of the port-extended network based on the determination that one of the first MAC address or the second MAC address was previously associated with the primary controller.

In accordance with yet another aspect, the present disclosure is directed to a computer-readable medium for use on a computer system, the computer-readable medium including computer-executable instructions for causing the computer system to perform a method for resolving split conditions in a port-extended network. The method may comprise receiving first information indicative of a first MAC address of a first controller on a first fabric link and second information indicative of a second MAC address of a second controller on a second fabric link. The method may also include determining that the first MAC address differs from the second MAC address and responsively determining that one of the first MAC address or the second MAC address was previously associated with a primary controller of the port-extended network. One of the first controller or the second controller is designated as the primary controller of the port-extended network based on the determination that one of the first MAC address or the second MAC address was previously associated with the primary controller.

FIG. 1 illustrates an exemplary port-extended network environment 100. Port-extended network environment refers to any network environment or architecture that includes a plurality of network devices that, although distributed in individual chassis (and possibly in geographically disparate areas), are configured to be managed as a single network device. For example, as illustrated in FIG. 1, port-extended network environment 100 may include one or more controller switches 110a, 110b (collectively "controller node 110") acting as a management console and one or more satellite switches 120a, 120b, 120c (collectively "satellite node 120"), 130a (satellite node 130), 140a (satellite node 140). Controller nodes 110 may be coupled to one or more of the satellite nodes 120, 130, 140, either directly over Ethernet or through one or more of the other satellite nodes or through some other communication network. A controller switch 110a or 110b may be selected as primary controller switch for the controller node. The primary controller switch manages the controller node, which manages the satellite nodes 120, 130, 140, which manage their individual satellite switches, providing a common control plane and management interface to the port-extended network environment 100 as a single network element. Port-extended networks are sometimes also referred to as "fabric-extended" (or "FEX") networks, with the interconnect network between controller node 110 and satellite nodes 120, 130, 140 referred to as the "fabric" or "fabric network" and the nodes referred to as "fabric nodes".

Port-extended network environment 100, as the term is used herein, refers to any environment in which the size and capacity of the port-extended logical switch is virtually "elastic" with the number of ports expandable and retractable with the addition of addition (or removal) of port expansion modules and/or satellite switches.

In certain embodiments, port expansion modules may include or embody modular line cards that are configured to be electrically coupled to controller switches 110a or 110b by way of a local communication bus. In general, modular line cards are mounted in a common chassis of controller switch 110a or 110b.

In certain embodiments, such as those illustrated in FIGS. 1-4, port expansion modules may include physically separate network devices, such as satellite switches 120a, 120b, 120c, 130a, 140a, that can be electronically programmed to operate as "virtual" line cards of controller 110. Unlike modular port expansion line cards, satellite nodes 120, 130, 140 may be deployed in geographically disparate locations from controller node 110, with communication handled over Ethernet or some other communication network.

As illustrated, for example, in FIG. 1, port-extended system 100 may be configured or embodied as a controller node 110 (sometimes referred to as a "FEX-master switch") acting as a management console, and one or more satellite nodes 120, 130, 140 (sometimes referred to as "FEX nodes"), fabric links connecting controller node 110 to satellite node(s) 120, 130, 140, and edge ports (either on controller switches or satellite switches) connecting external to system 100.

Any link connecting controller node 110 to satellite nodes 120, 130, 140 is typically referred to as a "fabric link." A fabric link has a fabric downlink port (fabric link downward-facing port) on controller node 110 to a fabric uplink port (fabric link upward-facing port) on satellite nodes 120, 130, 140. The fabric links connecting controller node 110 to satellite nodes 120, 130, 140 may be collectively referred to as "the fabric" connecting the "fabric nodes".

The node-internal links connecting one or more controller switches 110a, 110b to one another may be referred to as VSS links, and may be dedicated for communicating control, status, and health messages between controller switches 110a, 110b. For example, VSS links may provide an interface whereby each of the management consoles can monitor the others to ensure that failures in one or more of the consoles is properly accounted for and addressed, in order to maintain proper functionality of the port-extended network 100. Similar, the node-internal links connecting one or more satellite switches 120a, 120b, 120c may be referred to as stack links or ring links, and may be similarly dedicated. Finally, although the exemplary embodiment shows VSS for controller nodes and stack aggregation for satellite nodes, the split-node techniques herein are general to various aggregation techniques (stack aggregation for controller, VSS aggregation for satellite, or other cluster techniques).

In an exemplary embodiment, the edge ports (i.e., ports connecting to components outside the port-extended system 100, also known as external ports) are uniquely represented on the management console 110 for management actions. The edge ports can be native-ports on the controller node's switches or ports on the satellite nodes' switches. The external ports on satellite nodes 120, 130, 140 may be referred to as port-extended (or FEX) host ports. The external ports on the physical switches comprising controller node 110 may be referred to as controller local ports. The external ports across both controller node 110 and satellite nodes 120, 130, 140 are referred to as external ports.

Viewed externally (either by peers or through management plane), the port-extended system looks like a single, logical switch. Internally to the port-extended system, the system's data plane, control plane, and management plane functionality must be mapped onto controller node 110, satellite nodes 120, 130, 140, the protocols running over the fabric connecting the two, and the protocols internal to the controller and satellite nodes. To first order, the port-extended system comprises data, control, and management planes centralized at the controller node's current primary switch, supported by satellite nodes 120, 130, 140, as appropriate. Certain functionality can be distributed back out to satellites, but the functionality is typically managed and directed by the controller rather than handled by the satellite autonomously.

The FEX architecture includes a distribution layer node (sometimes referred to as a "VSS cluster"), which is embodied in FIGS. 1-4 as controller switch (s) 110a, 110b and a set of attached access switches, which are embodied in FIGS. 1-4 as satellite nodes 120, 130, 140. The access switch can either be a single physical switch (130a, 140a), or multiple switches stacked together to behave like a single logical switch (120a, 120b, 120c). As explained, these function together as a single logical switch and, from both switching and management standpoint, as a single integrated system. The distribution layer switch is the controller for this distributed system. The value of the FEX solution is in improved management, with corresponding operational expense reduction.

Figure 2:
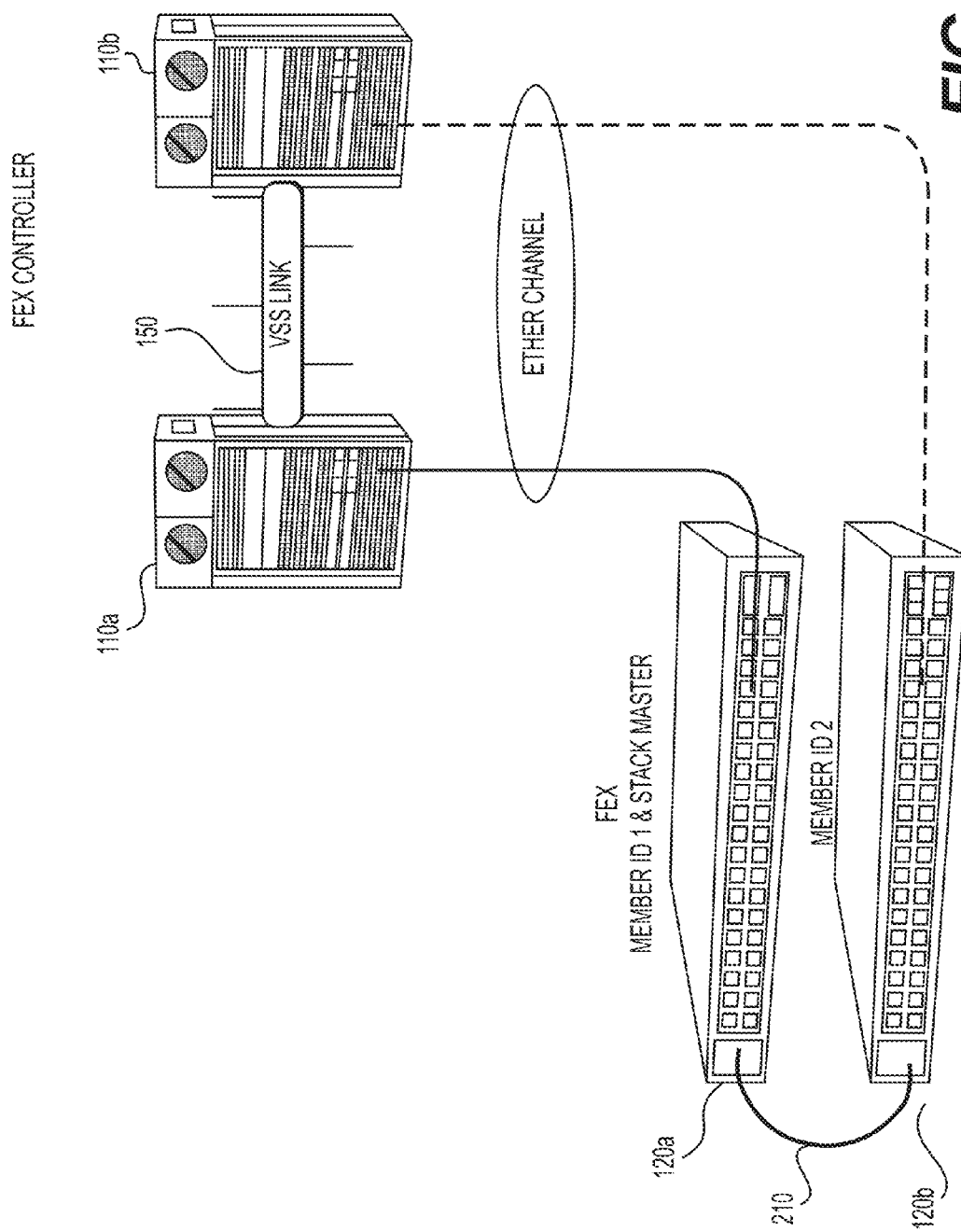
FIG. 2 illustrates a simplified port-extended network environment having a controller node (with current primary and secondary controller switches) and a single satellite node (with multiple stacked switches), in accordance with certain disclosed embodiments.
Figure 3:
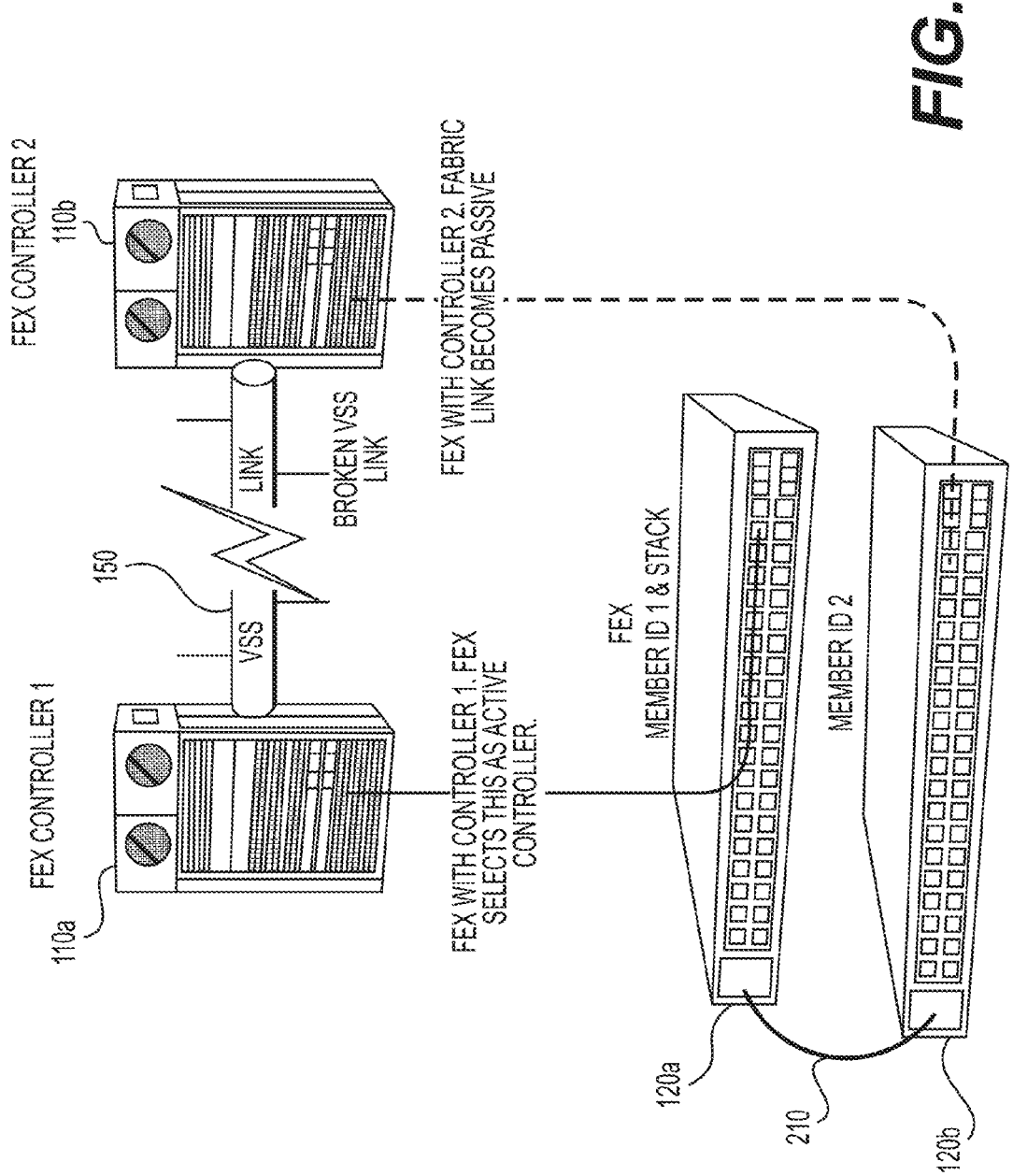
FIG. 3 shows the simplified port-extended network environment shown in FIG. 2 having a split-controller (split-brain) conflict present on the network due to a failure in the VSS link between the current primary and secondary controller switches, in accordance with certain disclosed embodiments.
Figure 4:
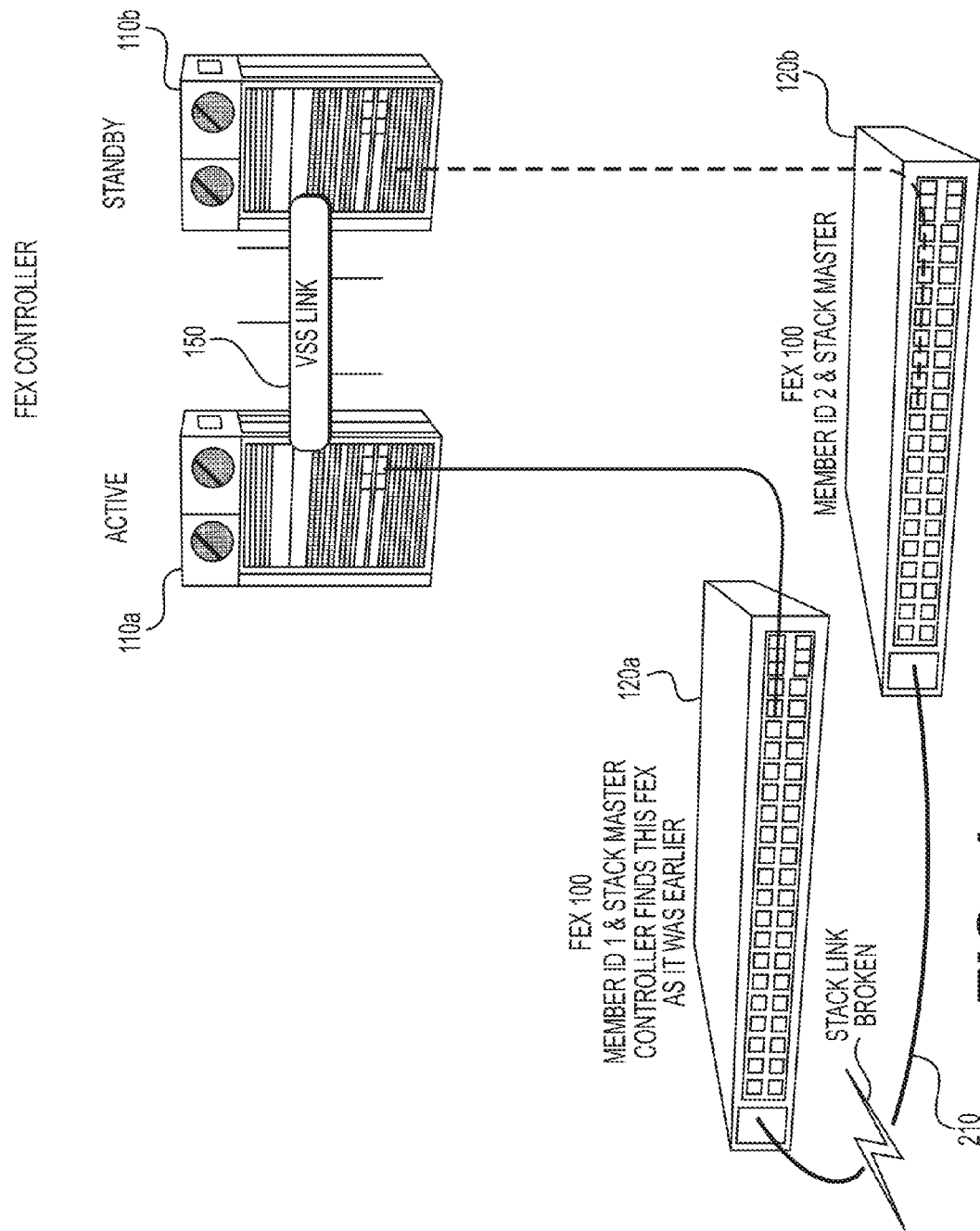
FIG. 4 shows the simplified port-extended network environment shown in FIG. 2 having a split-satellite (split-stack) conflict present on the network due to a failure in the communication link between the stack node's current stack master switch and ordinary stack member switch, in accordance with certain disclosed embodiments.

FIGS. 2-4 provide simplified examples of port-extended networks with two (primary and secondary) controller switches, 110a, 110b, respectively, and two (master (or primary) and ordinary member (or secondary)) satellite switches, 120a, 120b, respectively. Primary (or master), as the term is used herein, refers to a controller switch that operates as the primary control module for a particular node consisting of a cluster of switch elements. Similarly, secondary (or member), as the term is used herein, refers to a switch that is acting as a passive control element (i.e., an element that can function as the control element in the event of a failure of the primary control element). Thus, primary controller switch 110a is functioning as the controller switch and control interface for port-extended network environment 100, while primary satellite switch 120a is configured to operate as the controlling node for the switch stack containing satellite switches 120a and 120b.

As explained, nodes on the port-extended network, including controller node 110 and satellite nodes 120, 130, 140, are communicatively coupled to one another over an Ethernet network (also called a "fabric" network). Because the port-extended network is virtually customized to behave as a single, logical network switch, one of the nodes is the controller node, for example node 100. For the controller node, one of the switches may be designated the primary switch for that node. For example, controller switch 110a may be designated as a primary switch for the controller node 110, with controller switch 110b designated as secondary (or backup) controller. Similarly, satellite switch 120a may be designated to act as a primary controller of a stack of satellite switches comprising satellite node 120, while satellite switch 120b may be configured to act as the secondary (or back-up) controller for the stack. A difference is that controller switch 110a, being responsible for controller node 100, is hence responsible for the entire port-extended network, while controller switch 110b may be designated as a secondary (or back-up) controller for the port-extended network. In order to ensure adequate network operation and maintain reliability, secondary controller switch 110b may be connected to primary controller switch 110a (via a VSS link 150) and to satellite switches 120a, 120b. Similarly, all of the satellite member switches 120a, 120b, 120c of a stack are interconnected. Such interconnects among the switches making up a node and between controller node and the satellite nodes is adapted to facilitate sufficient communication between nodes of the port-extended network so that failures in one or more nodes (or interconnects between) may be corrected and their effects mitigated.

Processes and methods consistent with the disclosed embodiments are directed to solutions for detecting and resolving what are typically referred to as "split-node" (whether manifested as a split-brain type or split-stack type) conflicts. Split-node conflicts typically arise as a result of a failure in communication between the primary and secondary switches(s) of a node in the port-extended network. For example, FIG. 3 illustrates one type of communication failure that results in a split-brain conflict on the port-extended network. As shown in FIG. 3, the split-brain conflict may arise when the communication (VSS) link between the primary controller switch 110a and secondary controller switch 110b fails. Because the secondary controller switch 110b is not initially aware of the cause of the failure (i.e., whether it is the result of a failure of the primary controller switch 110a or just a failure in the communication link), secondary controller switch 110b may attempt to assert itself as the new primary controller for the port-extended network in order to maintain operation of the network.

Although the presentation of the secondary controller switch 110b as the new primary controller switch is advantageous when there is a legitimate failure in the (original) primary controller switch 110a, it can cause problems when the primary controller switch 110a is still serving as the primary controller. Indeed, because each controller asserts itself as the primary controller, satellite switches 120a, 120b may become overwhelmed by duplicate and/or conflicting control messages sent by multiple dueling controller switches. Unless there is an efficient mechanism for detecting and resolving such conflicts, such as those described herein, these conflicts can lead to significant processing delays, communication delays, and lost and misdirected external traffic, which may significantly negatively affect the reliability of the port-extended network.

Furthermore, it should be noted that FIG. 3 illustrates only one type of cause of a split-node conflict condition. Those skilled in the art will recognize that there are multiple types of issues that can cause a split-node condition in which a node's secondary switch attempts to assert itself as (new) primary switch while the node's (original) primary switch still asserts itself as a control entity of the node. For example, some split-node conflict conditions may manifest themselves as a result of a delay or other abnormality in the heartbeat or status signaling between primary controller switch 110a and secondary controller switch 110b, which may be interpreted by the secondary controller switch 110b as a failure event in the primary controller switch 110a. Consequently, those skilled in the art will recognize that, although FIG. 3 illustrates an exemplary communication failure that results in a split-node conflict condition on the port-extended network, the presently disclosed systems and methods for detecting and resolving the split-node conflict conditions should not be limited to split-node conflicts resulting from the specific causes listed herein.

Indeed, FIG. 4 illustrates another type of split-node condition. This split-node condition is manifested as a split-stack type of conflict. Similar to the split-brain condition shown in FIG. 3, the split-stack condition may manifest itself, in one exemplary embodiment, as a failure in the communication link 210 between switch node 120's primary (master) satellite switch 120a and a member (or secondary) satellite switch 120b. Similar to the split-brain conflict condition illustrated in FIG. 3, the split-stack conflict may arise when the secondary satellite switch 120b, having detected an issue communicating with the primary satellite switch 120a, may attempt to assert itself as the primary (master) node of the stack. Since the (original) primary satellite switch 120a is still asserting itself to controller node 110 as the primary satellite switch 120a, a split-stack conflict arises at stack node 120.

As with the split-brain conflict condition, split-stack conflict conditions may manifest themselves in a variety of ways. Consequently, those skilled in the art with appreciate that the presently disclosed systems and methods for detecting and resolving a split-stack conflict are not limited by the manner in which the conflict manifested itself.

Figure 5:
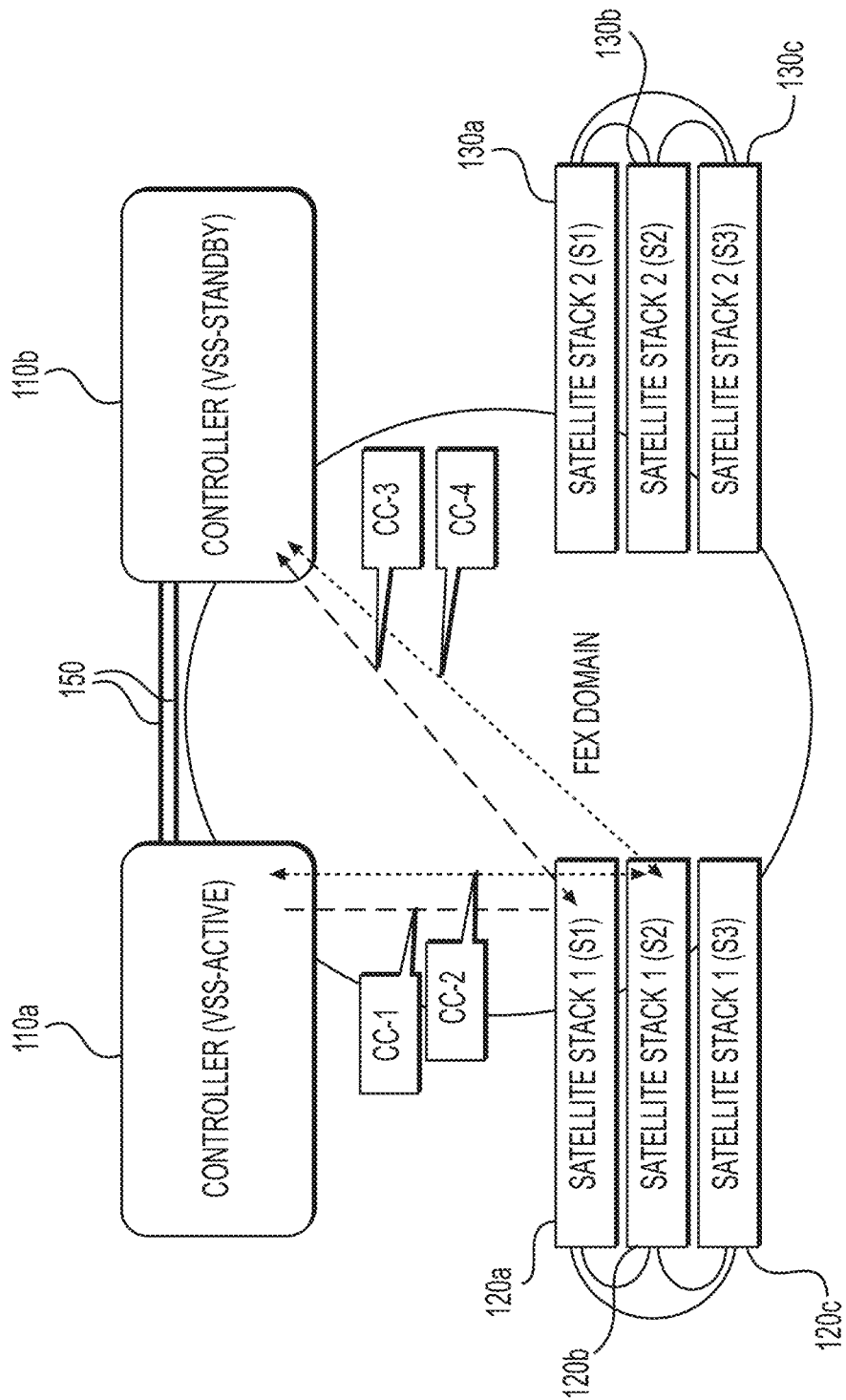
FIG. 5 provides a block diagram illustrating various communication paths between controller switches and stack member switches in order to maintain reliability and redundancy of the port-extended networks, in accordance with certain disclosed embodiments.

To fully appreciate how the split-node (whether it be a split-brain or split-stack) conflict can be resolved, it is useful to have an understanding of how the controller nodes and satellite nodes communicate with each other over fabric links, and also of how the primary and back-up switches in a node communicate with one another over node-internal links. FIG. 5 illustrates an exemplary model of communication channel paths that are used to ensure that primary and secondary controller switches 110a, 110b and satellite switches 120a, 120b connect with one another in order to remain prepared in the event of a legitimate failover event. FIG. 5 is an exemplary diagram illustrating communication channel paths that are established in a FEX domain. As shown in FIG. 5, multiple fabric links CC-1, CC-2, CC-3, CC-4 connect controller 110 with satellite 120. In particular, the two controller switches are each independently connected to two stack switches, and vice versa, so under normal conditions all 4 links between controller node and satellite node are available and discovery/health protocols can run over all four of these fabric links. In case of failure/reload in the stack master switch (i.e., satellite switch 120a), satellite switch 120b becomes the new stack master and CC-2 and CC-4 are both still available as communication channels. If instead failure/reload occurs in controller primary switch 110a, 110b takes over and CC-3 and CC-4 are both available. If both these events are in progress simultaneously, CC-4 is still available. (Applications internal to the node are responsible for implementing high availability.) Note, however, that if the failure occurs in an intra-node link (such as VSS link 150 or stack link) rather than in the primary switches themselves, then all four links are still available.

Figure 6:
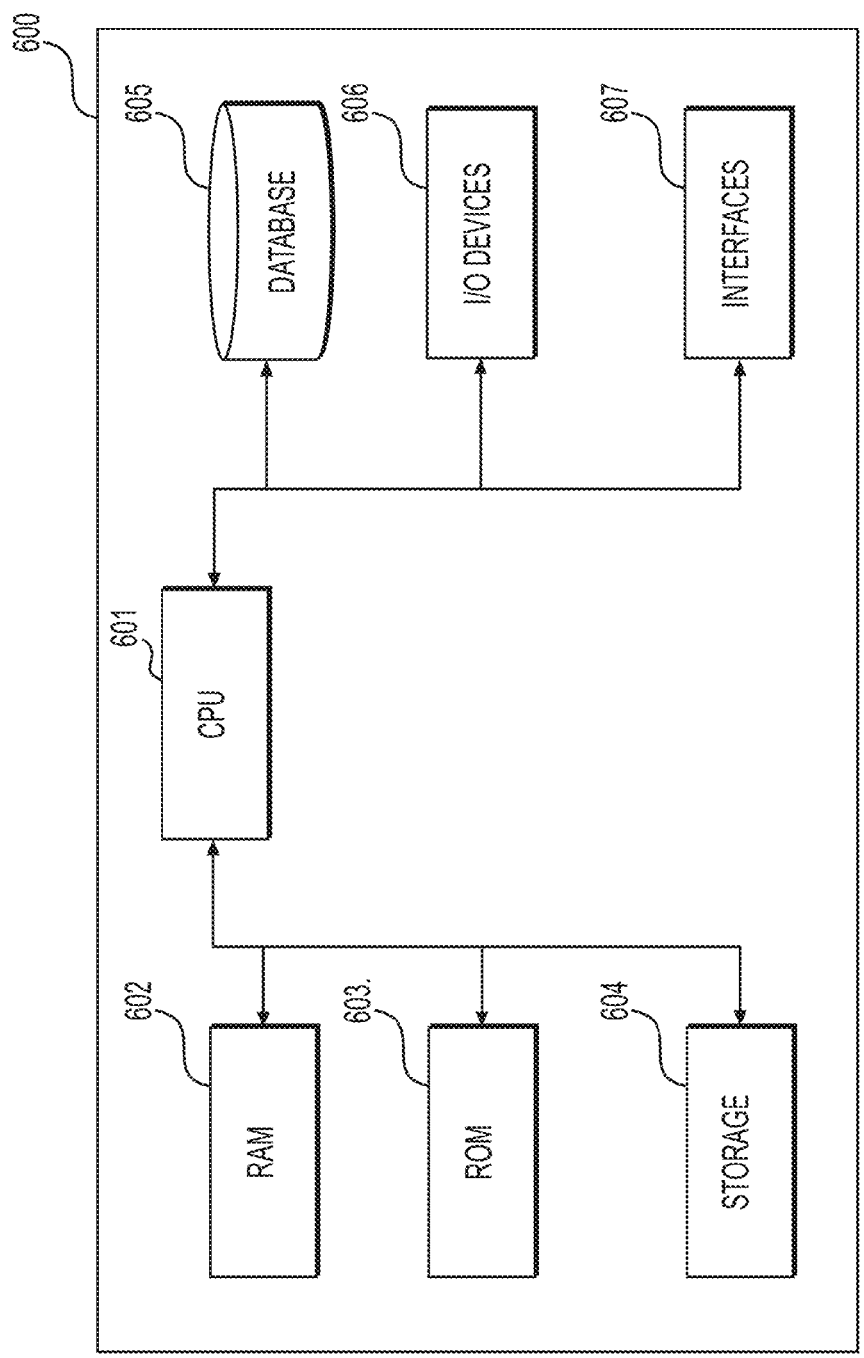
FIG. 6 provides a schematic illustration of exemplary components associated with a control switches and/or satellite switches, and in which methods consistent with certain disclosed embodiments may be implemented.

According to one embodiment, and as illustrated in FIG. 6, controller node 110 and satellite nodes 120, 130, 140 may each include or embody a processor-based networking device 600 that is configured to transport network traffic using one or more specialized communication protocols. As illustrated in FIG. 5, networking device 600 may include one or more hardware and/or software components configured to execute software programs, such as software configuring port-extended network environment and formatting data for transporting network traffic over a fabric associated with the port-extended network environment.

Such a networking device may include one or more hardware components such as, for example, a central processing unit (CPU) or microprocessor 601, a random access memory (RAM) module 602, a read-only memory (ROM) module 603, a memory or data storage module 604, a database 605, one or more input/output (I/O) devices 606, and an interface 607. Alternatively and/or additionally, networking device 600 may include one or more software media components such as, for example, a computer-readable medium including computer-executable instructions for performing methods consistent with certain disclosed embodiments. It is contemplated that one or more of the hardware components listed above may be implemented using software. For example, storage 604 may include a software partition associated with one or more other hardware components of networking device 600. Networking device 600 may include additional, fewer, and/or different components than those listed above. It is understood that the components listed above are exemplary only and not intended to be limiting.

CPU 601 may include one or more processors, each configured to execute instructions and process data to perform one or more functions associated with networking device 600. As illustrated in FIG. 6, CPU 601 may be communicatively coupled to RAM 602, ROM 603, storage 604, database 605, I/O devices 606, and interface 607. CPU 601 may be configured to execute sequences of computer program instructions to perform various processes, which will be described in detail below. The computer program instructions may be loaded into RAM 602 for execution by CPU 601.

RAM 602 and ROM 603 may each include one or more devices for storing information associated with an operation of networking device 600 and/or CPU 601. For example, ROM 603 may include a memory device configured to access and store information associated with networking device 600, including information for identifying and registering MAC addresses associated with network compatible devices. RAM 602 may include a memory device for storing data associated with one or more operations of CPU 601. For example, ROM 603 may load instructions into RAM 602 for execution by CPU 601.

Storage 604 may include any type of mass storage device configured to store information that CPU 601 may need to perform processes consistent with the disclosed embodiments. For example, storage 604 may include one or more magnetic and/or optical disk devices, such as hard drives, CD-ROMs, DVD-ROMs, or any other type of mass media device. Alternatively or additionally, storage 604 may include flash memory mass media storage or other semiconductor-based storage medium.

Database 605 may include one or more software and/or hardware components that cooperate to store, organize, sort, filter, and/or arrange data used by networking device 600 and/or CPU 601. CPU 601 may access the information stored in database 605 to in order to identify, for example, ACL rules 510 associated with egress processing schemes in accordance with the disclosed embodiments. It is contemplated that database 355 may store additional and/or different information than that listed above.

I/O devices 606 may include one or more components configured to communicate information with a component or user associated with port-extended network environment 100. For example, I/O devices 606 may include a console with an integrated keyboard and mouse to allow a user to input parameters associated with networking device 600. I/O devices 606 may also include a display including a graphical user interface (GUI) for providing a network management console for network administrators to configure networking device 600. I/O devices 606 may also include peripheral devices such as, for example, a printer for printing information associated with networking device 600, a user-accessible disk drive (e.g., a USB port, a floppy, CD-ROM, or DVD-ROM drive, etc.) to allow a user to input data stored on a portable media device, a microphone, a speaker system, or any other suitable type of interface device. I/O devices may be configured to output network performance results.

Interface 607 may include one or more components configured to transmit and receive data via a communication network, such as the Internet, a local area network, a workstation peer-to-peer network, a direct link network, a wireless network, or any other suitable communication platform. For example, interface 607 may include one or more modulators, demodulators, multiplexers, demultiplexers, network communication devices, wireless devices, antennas, modems, and any other type of device configured to enable data communication via a communication network. According to one embodiment, interface 607 may be coupled to or include wireless communication devices, such as a module or modules configured to transmit information wirelessly using Wi-Fi or Bluetooth wireless protocols.

Processes and methods consistent with the disclosed embodiments provide solutions for facilitating the detection and resolution of split-node conflicts that arise in port-extended networks similar to those described here. Indeed, features and systems for implementing the presently disclosed split-node conflict resolution schemes may quickly and efficiently mitigate communication errors and delays that are caused when two or more nodes that simultaneously behave as the primary switch of a fabric node in the port-extended system. The presently disclosed solutions for resolving split-node conflicts may allow network administrators to establish faster failover thresholds, without concern that propagation of potential "false-positives" will place an undue burden on the network fabric. As a result, downtime or delay associated with a failure event may be significantly reduced. FIG. 7 provides a flowchart illustrating an exemplary method for detecting and resolving split-controller conflicts in port-extended networks.

The procedures herein depend on the controller node and each satellite node learning the identity of the primary switch of the neighbor node at the other end of each fabric link and reporting that received primary switch information back to the neighbor node. Such information, which must be unique across all the switches potentially connected to the port-extended system, could be a switch MAC address. Under normal operating conditions, but not under the failure conditions of interest here, the neighbor node will be reporting the same primary switch identity on all fabric links.

Primary switch identification information is exchanged in the Satellite Discovery Protocol (SDP) periodic messages that the nodes might send and expect to receive over all their fabric links, containing identifying MAC address information. In the embodiment here, for instance in FIG. 5, satellite node 120 would send SDP communications over CCs 1-4, as would controller node 110, and each would expect to receive SDP communications from the other. (Additionally, controller node 110 would exchange SDP communications with satellite 130 through CCs not shown.)

As illustrated in FIG. 7, in flowchart 700, the method for detecting and resolving split-controller conflicts commences upon receipt by a satellite primary switch such as 120*a*, over a first fabric link, the first communication indicative of a switch identifier (e.g. MAC address) of the controller node's master switch such as 110*a* (Block 710). The received communication may also include, if available, a node identifier, such as a node MAC address, that is constant regardless of which switch is currently primary switch for the node. The primary satellite switch 120*a* may store the information indicative of the primary controller switch 110*a* in memory and subsequently look to the primary controller switch 110*a* for command and control instructions associated with the port-extended network.

After receipt of information indicative of the first MAC address, satellite node 120 may subsequently receive second information, either on the original link or on a second link, indicative of the MAC address of the controller's primary switch (Block 720). The received second information may come in the form of a data packet over a fabric link attached to satellite switch 120*a* or attached to some other satellite switch in the satellite 120. Upon receipt of the MAC address information, satellite node 120 may determine whether the first MAC address and the second MAC address for the master control device are the same (Block 730).

If the first MAC address and second MAC address are the same (Block 730: No, indicating that there is no possible split-controller conflict and no possible controller primary switch change), satellite switch 120*a* continues normal data processing operations (Block 731).

If on the other hand, the first MAC address and the second MAC differ (Block 730: Yes, indicating the presence of a different device asserting itself as the controller primary switch), either on that second message or some later message, satellite switch 120*a* flags the presence in the port-extended system of either a the incorrect connection of switches from two controller nodes to a single satellite node, or of a split-controller conflict or of a controller primary switch change. Satellite switch 120*a* commences measures to determine which case applies, to the extent necessary to resolve the case.

As mentioned earlier, the SDP messages sent by the controller node, in addition to including the controller primary switch MAC address, include the controller node (aka cluster) MAC address if available. This node address is persistent across node failover and node split events, and thus allows disambiguating the controller incorrect wiring event, (Block 740:No) which is when an incorrect fabric wiring connection is made between a satellite node such as satellite 120 and a controller switch for an entirely different port extended system (e.g. port extended system 300, controller 310*a*). The satellite continues to accept the switch with the first MAC address as its controlling switch.

The satellite always includes its current decision of neighbor primary switch in the SDP messages it sends to the controller. In the case that a satellite node is attached to two controller nodes due to incorrect wiring, the losing controller can see that its claim of control has not been accepted. In this case, the emphasis is not on speedy change from one port extended system to another, but on notifying the event to each controller so that they in turn may report the event to a network administrator for correction.

If, on the other hand, the first and second MAC addresses are from two different switches from the same controller node (Block 740: Yes), then this is either a node-failover event or a split-node event. Obviously, if this turns out to be a failover event, the conflict must be resolved in favor of the switch with the second MAC address, as the switch with the first MAC address has experienced a failure. The next steps differ, however, depending on whether, in a particular implementation, a split-node conflict should be resolved in favor of the switch with the second MAC address or the switch with the first MAC address. If the split-node conflict should be resolved in favor of the switch with the second MAC address (Block 750: Yes), then the switch with the second MAC address is selected regardless of whether this is a split-node event or a node-failover event, and those events need not be distinguished. If, on the other hand, the split-node conflict should be resolved in favor of the first MAC address (Block 750: No), the two events must be distinguished before the decision can be made, as described below.

Specifically, satellite switch 120*a* and other satellite primary switches determine whether the original controller primary switch is still primary on any fabric links. As a first step, satellite switch 120*a* next SDP messages on each fabric link include special contents relating to control event disambiguation. Over a short period of time, on each fabric link, either the satellite will receive additional SDP messages from the controller or not. If a message is received, its claimed controller primary switch will be either the original controller primary switch, the newly claimed primary switch, or some other switch. If a message is not received, either the interface will experience a port down event or a timeout will be declared.

If no received controller primary switch MAC address is the same as the controller primary MAC address associated with the most recent (i.e., before detection of the conflict) primary controller (Block 760: No), the satellite concludes that the old primary controller switch has failed, and picks a new primary controller switch.

If, however, a received MAC address matches the controller primary MAC address from before the conflict (Block 760: Yes), the satellite node concludes that a split-controller situation has occurred and continues to honoring the original primary switch from before the conflict.

As above, the satellite includes its current decision of neighbor primary switch in the SDP messages it sends to the controller. In the event of a change to a new primary switch (Block 752 or Block 762), the new neighbor primary switch can see that its claim of being the primary switch has been honored by the satellite and take appropriate actions for its new role. In the event of a cluster split (Block 752 cluster split cases and Block 761 cases), the losing neighbor switch can see that its claim of being the primary switch is no longer honored (Block 752 cluster split cases) or never honored (Block 762 cases) allowing the losing device to take appropriate action based on their internal algorithms for handling split-brain situations.

A number of complexities and edge conditions must be addressed by this algorithm. For instance, when satellite node 120 processes an SDP message on CC-1 claiming a new controller primary switch, and immediately after processes an SDP message on CC-2 claiming the old controller primary switch, this could indicate that the message processed second was sent second (split-controller) or could be the result of the message processed second being sent prior to the failure of the old controller primary switch and received/processed out-of-order (controller failover). The SDP protocol's special message contents for controller event disambiguation include an additional sequence number that the controller will echo back. Received messages from the controller not include this sequence number are assumed to be from before the controller event and ignored.

The quicker the control event disambiguation algorithm runs, the sooner the switch can proceed to its next state. The SDP protocol's special messages are thus sent immediately on detection of the controller event, and the special contents include a flag to provoke an immediate response, allowing quicker termination of the algorithm.

It should be noted that, although the method described in flowchart 700 of FIG. 7 is described with respect to a split-brain type conflict, the methods are also applicable to detection and resolution of conflicts of the split-stack type.

Indeed, the processes described with respect to FIG. 7 as being performed by the satellite node(s), in response to detection of the two or more controllers attempting to assert themselves as the primary controller switch of the port-extended network, may be implemented by controller switch(s) 110a, 110b, in response to detection of one or more satellite nodes of a stacked switch trying to assert themselves as the master (or primary) node of the stack.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order or by particular switches in a node, this should not be understood as requiring that such operations be performed in the particular order shown or in sequential order, or that all illustrated operations be performed, to achieve desirable results, or that the specified switch must perform the operation. In certain circumstances, multitasking, parallel processing and distribution of tasks to the various switches in the node may be advantageous. Moreover, the separation of various system components in the implementations described above should not be understood as requiring such separation in all implementations, and it should be understood that the described program components and systems may generally be integrated together in a single software product or packaged into multiple software products.

It will be apparent to those skilled in the art that various modifications and variations can be made to the disclosed systems and methods for designating packets for customized data processing in port-extended architectures. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for resolving split conditions in a port-extended network, the method comprising:
   receiving first information indicative of a first MAC address of a first controller on a first fabric link;
   receiving second information indicative of a second MAC address of a second controller on a second fabric link, wherein the first and second controllers comprise distribution layer switches;
   determining that the first MAC address differs from the second MAC address by generating a split-brain conflict notification message and transmitting the split-brain conflict notification message to each access layer control switch associated with the port-extended network;
   determining that one of the first MAC address or the second MAC address was previously associated with a primary controller of the port-extended network; and
   designating one of the first controller or the second controller as the primary controller of the port-extended network based on the determination that one of the first MAC address or the second MAC address was previously associated with the primary controller.

2. The method of claim 1, further comprising:
   determining that one of the first MAC address or the second MAC address was not previously associated with the primary controller of the port-extended network;
   designating one of the first controller or the second controller as a secondary controller of the port-extended network based on the determination that one of the first MAC address or the second MAC address was not previously associated with the primary controller of the port-extended network.

3. The method of claim 1, further comprising transmitting information indicative of the designation of the primary controller to each node coupled to the port-extended network.

4. A method for resolving split conditions in a port-extended network, the method comprising:
   receiving first information indicative of a first MAC address of a first controller on a first fabric link;
   receiving second information indicative of a second MAC address of a second controller on a second fabric link, wherein the first and second controllers comprise access layer switches;
   determining that the first MAC address differs from the second MAC address by generating a stack-split conflict notification message and transmitting the stack-split conflict notification message to a distribution layer control switch associated with the port-extended network;
   determining that one of the first MAC address or the second MAC address was previously associated with a primary controller of the port-extended network; and
   designating one of the first controller or the second controller as the primary controller of the port-extended network based on the determination that one of the first MAC address or the second MAC address was previously associated with the primary controller.

5. The method of claim 1, wherein upon determining that the first MAC address differs from the second MAC address and until the designating of one of the first controller or the second controller as the primary controller, the method further comprises withholding transmission of control messages associated with the port-extended system.

6. The method of claim 4, further comprising:
   determining that one of the first MAC address or the second MAC address was not previously associated with the primary controller of the port-extended network;
   designating one of the first controller or the second controller as a secondary controller of the port-extended network based on the determination that one of the first MAC address or the second MAC address was not previously associated with the primary controller of the port-extended network.

7. The method of claim 4, further comprising transmitting information indicative of the designation of the primary controller to each node coupled to the port-extended network.

8. The method of claim 4, wherein upon determining that the first MAC address differs from the second MAC address and until the designating of one of the first controller or the second controller as the primary controller, the method further comprises withholding transmission of control messages associated with the port-extended system.

9. A network switch associated with a port-extended network, comprising:
   a first plurality of fabric ports configured for communication with at least one node coupled to the port-extended network;
   a processor, communicatively coupled to the first plurality of fabric ports, and configured to:
      receive first information indicative of a first MAC address of a first controller from a first of the fabric ports;
      receive second information indicative of a second MAC address of a second controller from a second of the fabric ports, first and second controllers comprise distribution layer switches;
      determine that the first MAC address differs from the second MAC address by generating a split-brain conflict notification message and transmitting the split-brain conflict notification message to each access layer control switch associated with the port-extended network;
      determine that one of the first MAC address or the second MAC address was previously associated with a primary controller of the port-extended network; and
      designate one of the first controller or the second controller as the primary controller of the port-extended network based on the determination that one of the first MAC address or the second MAC address was previously associated with the primary controller.

10. The node of claim 9, wherein the processor is further configured to:
   determine that one of the first MAC address or the second MAC address was not previously associated with the primary controller of the port-extended network; and
   designate one of the first controller or the second controller as a passive controller of the port-extended network based on the determination that one of the first MAC address or the second MAC address was not previously associated with the primary controller of the port-extended network.

11. The node of claim 9, wherein the processor is further configured to transmit information indicative of the designation of the primary controller to each node coupled to the port-extended network.

12. A network switch associated with a port-extended network, comprising:
   a first plurality of fabric ports configured for communication with at least one node coupled to the port-extended network;
   a processor, communicatively coupled to the first plurality of fabric ports, and configured to:
      receive first information indicative of a first MAC address of a first controller from a first of the fabric ports;
      receive second information indicative of a second MAC address of a second controller from a second of the fabric ports, wherein the first and second controllers comprise access layer switches;
      determine that the first MAC address differs from the second MAC address by generating a stack-split conflict notification message and transmitting the stack-split conflict notification message to a distribution layer control switch associated with the port-extended network;
      determine that one of the first MAC address or the second MAC address was previously associated with a primary controller of the port-extended network; and
      designate one of the first controller or the second controller as the primary controller of the port-extended network based on the determination that one of the first MAC address or the second MAC address was previously associated with the primary controller.

13. The node of claim 12, wherein the processor is further configured to:
   determine that one of the first MAC address or the second MAC address was not previously associated with the primary controller of the port-extended network; and
   designate one of the first controller or the second controller as a passive controller of the port-extended network based on the determination that one of the first MAC address or the second MAC address was not previously associated with the primary controller of the port-extended network.

14. The node of claim 12, wherein the processor is further configured to transmit information indicative of the designation of the primary controller to each node coupled to the port-extended network.

15. A computer-readable medium for use on a computer system, the computer-readable medium including computer-executable instructions for causing the computer system to perform a method for resolving split conditions in a port-extended network, wherein execution of the instructions, cause the processor to:
   receive first information indicative of a first MAC address of a first controller on a first fabric link;
   receive second information indicative of a second MAC address of a second controller on a second fabric link, wherein the first and second controllers comprise distribution layer switches;
   determine that the first MAC address differs from the second MAC address by generating a split-brain conflict notification message and transmitting the split-brain conflict notification message to each access layer control switch associated with the port-extended network;
   determine that one of the first MAC address or the second MAC address was previously associated with an active controller of the port-extended network; and
   designate one of the first controller or the second controller as the active controller of the port-extended network based on the determination that one of the first MAC address or the second MAC address was previously associated with the active controller.

16. The computer-readable medium of claim 15, wherein the instructions, when executed by the processor, cause the processor to:
   determine that one of the first MAC address or the second MAC address was not previously associated with the primary controller of the port-extended network; and
   designate one of the first controller or the second controller as a secondary controller of the port-extended network based on the determination that one of the first MAC address or the second MAC address was not previously associated with the active controller of the port-extended network.

17. The computer-readable medium of claim 15, wherein the wherein the instructions, when executed by the processor, cause the processor to transmit information indicative of the designation of the active controller to each node coupled to the port-extended network.

18. A computer-readable medium for use on a computer system, the computer-readable medium including computer-executable instructions for causing the computer system to perform a method for resolving split conditions in a port-extended network, wherein execution of the instructions, cause the processor to:
receive first information indicative of a first MAC address of a first controller on a first fabric link;
receive second information indicative of a second MAC address of a second controller on a second fabric link, wherein the first and second controllers comprise access layer switches;
determine that the first MAC address differs from the second MAC address by generating a stack-split conflict notification message and transmitting the stack-split conflict notification message to a distribution layer control switch associated with the port-extended network;
determine that one of the first MAC address or the second MAC address was previously associated with a primary controller of the port-extended network; and
designate one of the first controller or the second controller as the primary controller of the port-extended network based on the determination that one of the first MAC address or the second MAC address was previously associated with the primary controller.

19. The computer-readable medium of claim 18, wherein the instructions, when executed by the processor, cause the processor to:
determine that one of the first MAC address or the second MAC address was not previously associated with the primary controller of the port-extended network; and
designate one of the first controller or the second controller as a secondary controller of the port-extended network based on the determination that one of the first MAC address or the second MAC address was not previously associated with the active controller of the port-extended network.

20. The computer-readable medium of claim 18, wherein the wherein the instructions, when executed by the processor, cause the processor to transmit information indicative of the designation of the active controller to each node coupled to the port-extended network.

* * * * *